Figure 1:
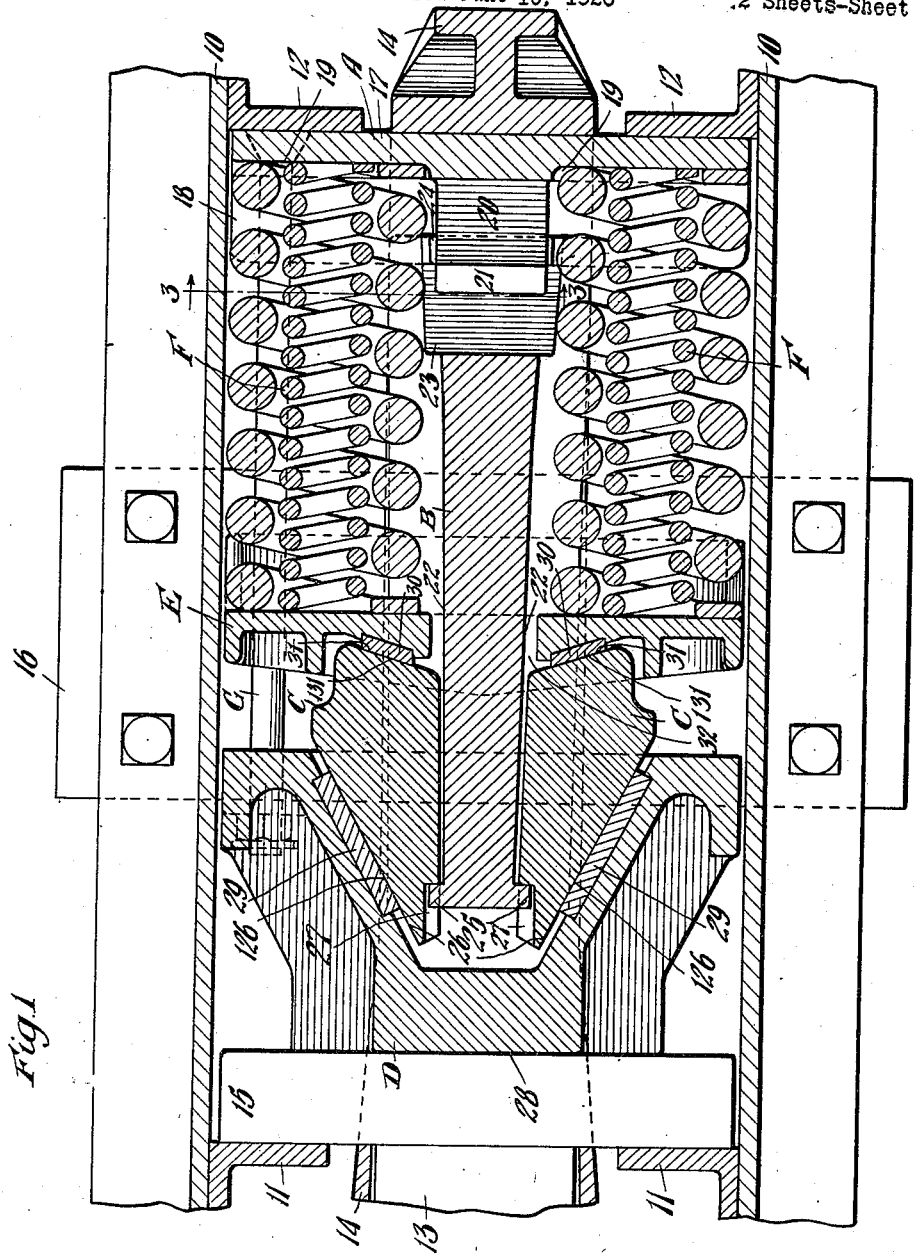

Nov. 8, 1927.

W. A. GEIGER 1,648,303

FRICTION SHOCK ABSORBING MECHANISM

Filed June 10, 1926   2 Sheets-Sheet 1

Witness
Hans M. Rachlitz

Inventor
William A. Geiger
George I. Haight
By
His Atty.

Nov. 8, 1927.  
W. A. GEIGER  
1,648,303  
FRICTION SHOCK ABSORBING MECHANISM  
Filed June 10, 1926  
2 Sheets-Sheet 2
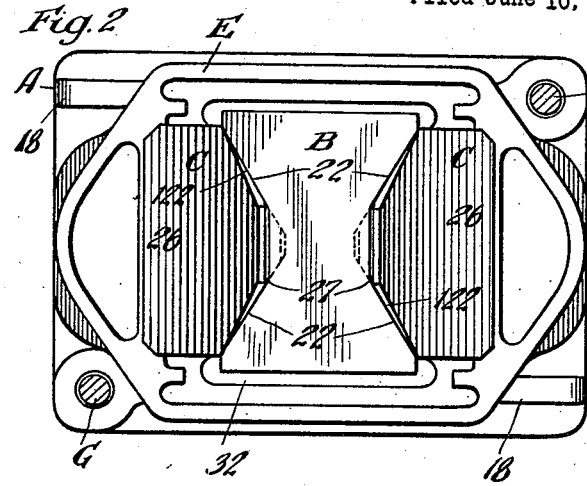
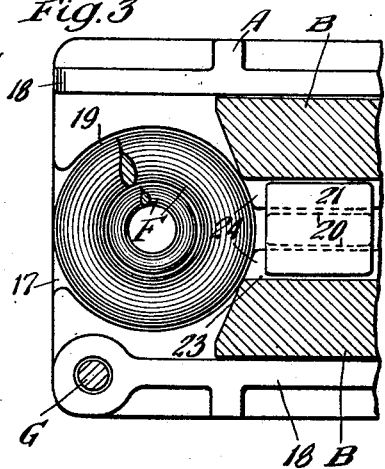
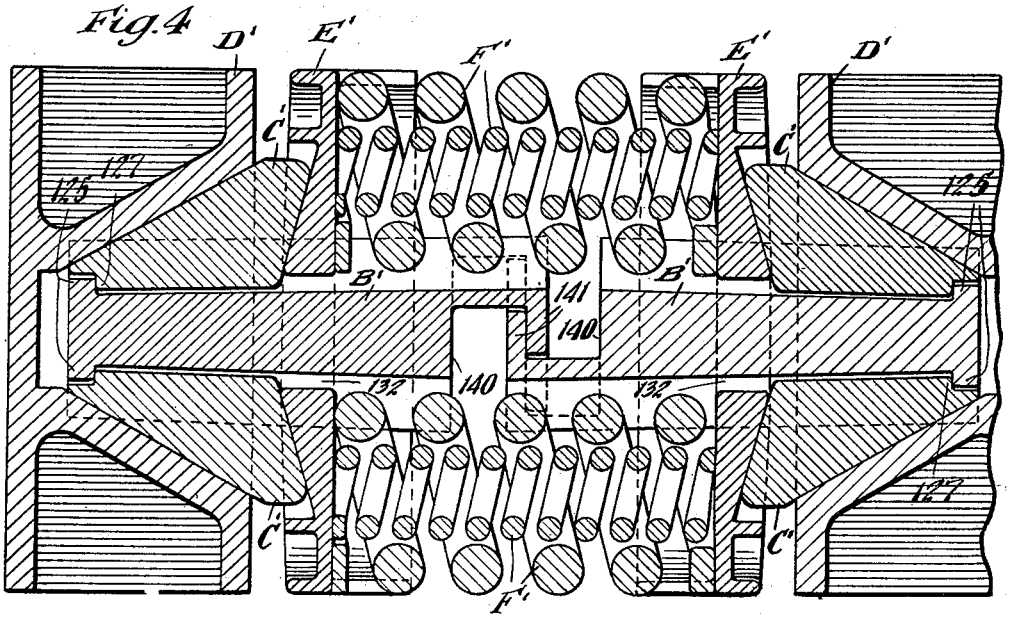
Witness  
Hans M. Rachlitz
Inventor  
William A. Geiger  
By George I. Haight  
His Atty.

Patented Nov. 8, 1927.

1,648,303

UNITED STATES PATENT OFFICE.

WILLIAM A. GEIGER, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed June 10, 1926. Serial No. 115,069.

This invention relates to improvements in friction shock absorbing mechanisms.

One object of the invention is to provide a high capacity friction shock absorbing mechanism having preliminary spring action.

Another object of the invention is to provide a mechanism of the character indicated, especially adapted for railway draft riggings, including a friction post and a plurality of spring resisted, friction shoes cooperating therewith, wherein the post is adapted for limited movement during the compression of the mechanism to provide for a purely spring resistance during a predetermined preliminary portion of the compression stroke.

Still another object of the invention is to provide a friction shock absorbing mechanism embodying a post and a plurality of cooperating friction elements, the arrangement being such that during a predetermined initial portion of the compression stroke, the post and friction elements are moved in unison, resisted only by the main springs to absorb the lighter shocks and during the remainder of the compression stroke are forced to move relatively to each other to absorb the heavier shocks.

Other objects and advantages of the invention will more clearly appear from the description and claims hereinafter following.

In the drawings forming a part of this specification, Figure 1 is a longitudinal, horizontal, sectional view of a portion of a railway draft rigging showing my improvements in connection therewith. Figure 2 is a front end, elevational view of the shock absorbing mechanism proper, with the front follower casing removed. Figure 3 is a vertical, transverse, sectional view to one side of the central axis of the mechanism, corresponding substantially to the line 3—3 of Figure 1. And Figure 4 is a view similar to Figure 1, of a different embodiment of the invention.

In said drawing, 10—10 indicate channel-shaped center or draft sills, to the inner faces of which are secured front stop lugs 11—11 and rear stop lugs 12—12. The inner end portion of the draw bar is indicated by 13, to which is operatively connected a hooded yoke 14 of usual construction. The shock absorbing mechanism and a front follower 15, are disposed within the hooded yoke and the parts are operatively supported by a detachable saddle plate 16.

The improved shock absorbing mechanism proper, as shown in Figs. 1, 2 and 3, comprises, broadly, a rear follower member A; a friction post B; a pair of friction shoes C—C; a front follower casing D; a spring follower E; a twin spring resistance F; and retainer bolts G.

The rear follower member A is provided with a transverse rear wall 17 adapted to cooperate with the rear stop lugs 12. At the top and bottom of the end wall horizontally disposed, forwardly projecting flanges 18 are provided. The inner surface of the wall 17 is recessed at opposite sides as indicated at 19—19 to provide seats for the inner ends of the twin arranged coils of the main spring resistance F. The rear follower A is also provided with a vertically disposed central web 20 forwardly projecting from the rear wall and having transversely disposed top and bottom flanges at the free end thereof presenting a thread 21 for a purpose hereinafter described.

The friction post B is in the form of a relatively heavy, longitudinally disposed column having a pair of rearwardly converging friction surfaces 22—22 on the opposite sides thereof. As clearly shown in Figure 2, each of the friction surfaces 22 is preferably of V-shape. The rear end of the post is enlarged and horizontally slotted as indicated at 23, the slot 23 being T-shaped as shown, presenting horizontally disposed transverse flanges 24 at the rear thereof. The slot 23 accommodates the web 20 of the rear follower, the web operating to guide the post during movement thereof, and the T-section thereof cooperating with the shoulders 24 of the post to effect restoration of the post to normal position. As clearly shown in Figure 1, the rear end of the post is normally spaced from the inner surface of the end wall 17 of the rear follower, thereby permitting a predetermined amount of relative movement between the post and the rear follower during the initial portion of the compression stroke of the mechanism. At the forward end the post has a pair of oppositely projecting, vertically disposed ribs 25—25, for a purpose hereinafter described.

The friction shoes C—C are two in number and disposed at the opposite sides of the mechanism. Each of the shoes is preferably in the form of a casting and is adapted to cooperate with the corresponding side of the friction post, each shoe being provided with a V-shaped friction surface 122 adapted to slide on the corresponding friction surface 22 of the post. As clearly shown in Figs. 1 and 2, each shoe is provided with a wedge face 26 at the outer side thereof. Adjacent the front end, the inner side of each shoe is cut away to provide a transverse shoulder or abutment face 27 adapted to co-act with the corresponding rib 25 of the post, the rib and abutment face together acting as a means for restoring the post to its normal position after each actuation of the mechanism. In this connection, it is pointed out that the T-head 21 limits the outward movement of the post B to determine its full release position.

The front follower casing D is preferably in the form of a hollow casting, having a transverse vertical end wall 28 adapted to co-operate with the front follower 15. The side walls of the follower casing D diverge rearwardly of the mechanism and are provided with a pair of wear plates 29 on the inner surfaces thereof, the wear plates being seated in sockets formed in the side walls and presenting flat wedge faces 126 adapted to co-operate with the wedge faces 26 of the wedge blocks.

The spring follower E is in the form of a relatively heavy plate provided with a pair of seats at the forward side thereof adapted to receive wear plates 30—30 which are angularly disposed so as to present laterally inclined front surfaces 31 adapted to cooperate with similarly inclined faces 131—131 at the inner ends of the friction wedge shoes C. As clearly shown in Figure 1, the spring follower is reinforced by horizontally disposed flanges at the top and bottom thereof and vertically extending ribs. The spring follower plate E is provided with a central opening 32 of such a size as to freely accommodate the friction post B when the spring follower is in its rearmost position, upon full compression of the mechanism.

The main spring resistance F comprises two twin arranged sets of spring coils, each set comprising a relatively heavy outer coil and a lighter inner coil, the opposite ends of each set of coils bearing respectively on the inner surface of the rear main follower and the spring follower E.

The retainer bolts are two in number and arranged at diagonally opposite corners of the mechanism, each bolt having its opposite ends anchored respectively to the rear main follower and the front follower casing. The retainer bolts serve to maintain the mechanism of uniform overall length and hold the spring under initial compression.

The normal position of the parts is that shown in Figure 1, wherein the rear end of the friction post is spaced from the rear follower to permit a predetermined amount of preliminary action of the mechanism and the front end of the post is spaced from the inner surface of the transverse front wall of the follower casing D. The arrangement is such that the distance between the end wall of the front follower casing and the front end of the post plus the distance between the rear end of the post and the end wall of the rear follower is equal to the full compression of the mechanism. It will be evident that when the mechanism has been fully compressed, the rearward movement of the follower casing D will be limited by engagement with the front end of the post and the rear end of the post will be in engagement with the rear follower A, the parts thereupon acting as a solid column to transmit the actuating force to the stop lugs on the draft sills.

Assuming a buffing or compression action applied to the mechanism, the operation is as follows. As the front follower casing D is moved inwardly, a wedging action will be set up between the follower casing and the friction wedge shoes C, forcing the latter against the friction surfaces of the post B. As the follower D moves inwardly, the main spring resistance F will be compressed between the spring follower E and the rear wall of the follower A. At the same time, the friction post B will be carried rearwardly in unison with the friction shoes, due to the high frictional resistance between the latter and the post. This action will continue until the inner end of the post comes into abutment with the inner surface of the transverse end wall 17 of the follower A, whereupon the rearward movement of the post will be arrested and the shoes C will be forced to slip on the friction surfaces 22 of the post. Due to this action, the resistance offered will be greatly augmented. The shoes will be forced to move rearwardly at a greater rate than the front follower casing D, due to the diverging relation of the longitudinally disposed friction surfaces 22 of the post. A greater compression of the spring resistance elements will thus be effected. Inward movement of the front follower will finally be arrested by engagement thereof with the front end of the post, as hereinbefore described, thereby preventing the main springs from being driven solid.

Upon reduction of the actuating or compression force, the parts will be restored to normal position by the main spring resistance elements F, the latter directly forcing the shoes forwardly and the shoes in turn carrying the friction post outwardly therewith, due to the friction between these parts and the ribs 25 being engaged by the abutment surfaces 27. Outward movement of the post will be limited by the T-head 21 on the rear follower A and outward movement of the follower D and the associated parts will be limited by the retainer bolts G.

Referring to the embodiment of the invention illustrated in Fig. 4, D'—D' indiccate front and rear follower casings which co-operate with two sets of friction shoes C'—C' disposed at the front and rear ends of the mechanism, the front and rear followers and the co-operating friction shoes being provided with inter-engaging wedge faces acting in a manner similar to the corresponding wedge faces of the follower casing D and shoes C of the preferred form hereinbefore described. As shown in Figure 4, the friction post B' is made up of two sections which are movable relatively to each other, each section having outwardly converging friction surfaces on the opposite sides thereof which cooperate with similar friction surfaces on the inner sides of the front and rear sets of friction shoes C' respectively. The front and rear ends of the two sections of the post are provided with ribs 125 and the shoes are provided with co-operating abutment shoulders 127 in all respects similar to the ribs 25 and shoulders 27 of the preferred form and operating in a manner similar thereto to move the post sections outwardly during release. The inner end of each post section is cut away as indicated at 140, thereby providing an angular guide extension 141 adapted to work within the cut away portion of the other section of the post, the angular section cooperating to limit outward movement of the post sections to restore the parts to normal position. Twin arranged main spring resistance elements F' are disposed between the front and rear sets of friction shoes, the springs being arranged on opposite sides of the post and spring followers E' being interposed between the shoes and the springs at opposite ends of the mechanism. Each spring follower E' is of substantially the same construction as the spring follower E hereinbefore described and is provided with a pair of beveled faces adapted to cooperate with similar beveled ends on the corresponding friction wedge shoes C'. Each follower E' is also provided with a central opening 132 adapted to freely accommodate the corresponding post section. The front and rear follower casings D' preferably directly co-act with the stop lugs on the draft sills.

The operation of the embodiment of the invention illustrated in Figure 4 is substantially the same as that of the preferred form hereinbefore described, the only difference being that the post of the former is of the floating type, relative movement of the sections thereof being limited after a predetermined compression of the mechanism by the inner ends of the section coming into abutment.

While I have herein shown and described the preferred form of my invention, the same is merely illustrative and I contemplate all changes and modifications that come within the scope of the claims appended hereto.

I claim:

1. In a friction shock absorbing mechanism, the combination with relatively movable main followers; of a movable, centrally disposed friction post having its movement positively limited with respect to one of said followers to a predetermined extent, before the mechanism is fully compressed; of wedge-shoes engaging said post; co-operating abutment means on said shoes and post for restoring the post to normal position; means for yieldingly resisting movement of said shoes; and wedge-pressure-transmitting means cooperating with the shoes.

2. In a friction shock absorbing mechanism, the combination with main followers relatively movable toward and away from each other; of a movable friction post having its movement positively limited with respect to one of said main followers upon a predetermined compression of the mechanism, said post having stop shoulders thereon; of wedge shoes frictionally engaging said post, said shoes having stop shoulders thereon adapted to cooperate with the stop shoulders of the post to restore the latter to normal position; means for positively limiting outward movement of the post; means yieldingly opposing movement of said shoes; and wedge-pressure-transmitting means co-operating with the shoes.

3. In a friction shock absorbing mechanism, the combination with a central friction post having longitudinally disposed friction surfaces; of a plurality of friction shoes; a pair of main spring resistance elements on opposite sides of said post and cooperating with the shoes; a movable wedge pressure transmitting member cooperating with the shoes to force the same against the friction surfaces of the post and effect movement of the latter and said shoes inwardly of the mechanism as a unit during the initial portion of the compression stroke; means for limiting the inward and outward movement of the post, inward movement of said post being arrested after a predetermined portion of said compression stroke, whereby said shoes will be forced to move relatively to said friction post, and co-operating means on the shoes and post for positively restoring the post to normal position after each compression stroke.

In witness that I claim the foregoing I have hereunto subscribed my name this 5th day of June, 1926.

WILLIAM A. GEIGER.